United States Patent
Kochavara et al.

(10) Patent No.: US 11,734,041 B2
(45) Date of Patent: Aug. 22, 2023

(54) PERSISTENT VOLUME PLUGIN FOR CONTAINERS

(71) Applicant: Hewlett Packard Enterprise Development LP, Houston, TX (US)

(72) Inventors: Prashanto Kochavara, Westborough, MA (US); Priyanka Sood, Bangalore (IN); Suparna Bhattacharya, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 383 days.

(21) Appl. No.: 17/101,327

(22) Filed: Nov. 23, 2020

(65) Prior Publication Data

US 2021/0279088 A1 Sep. 9, 2021

Related U.S. Application Data

(60) Provisional application No. 62/985,756, filed on Mar. 5, 2020.

(51) Int. Cl.
*G06F 9/455* (2018.01)
*G06F 16/23* (2019.01)
*G06F 3/06* (2006.01)

(52) U.S. Cl.
CPC ........ *G06F 9/45558* (2013.01); *G06F 3/0604* (2013.01); *G06F 3/0644* (2013.01); *G06F 3/0664* (2013.01); *G06F 3/0673* (2013.01); *G06F 16/2379* (2019.01); *G06F 2009/45562* (2013.01); *G06F 2009/45579* (2013.01)

(58) Field of Classification Search
CPC .. G06F 9/45558; G06F 3/0604; G06F 3/0644; G06F 3/0664; G06F 3/0673; G06F 16/2379; G06F 2009/45562; G06F 2009/45579; G06F 3/0631; G06F 3/0665; G06F 16/192; G06F 11/1469; G06F 11/1451; G06F 3/065; G06F 16/128
See application file for complete search history.

(56) References Cited

U.S. PATENT DOCUMENTS

| 10,191,756 B2 * | 1/2019 | Voccio | G06F 3/0664 |
| 2011/0040812 A1 * | 2/2011 | Phillips | G06F 9/45541 |
| | | | 707/822 |
| 2015/0242228 A1 * | 8/2015 | Voccio | H04L 67/10 |
| | | | 718/1 |

(Continued)

OTHER PUBLICATIONS

Alex Chircop, "Persistent Storage for Containers: Stateful Apps in Docker", StorageOS, available online at <https://storageos.com/persistent-storage-containers-stateful-apps-docker>, Feb. 27, 2018, 9 pages.

(Continued)

*Primary Examiner* — Kenneth Tang
(74) *Attorney, Agent, or Firm* — Trop, Pruner & Hu, P.C.

(57) ABSTRACT

Architectures and techniques for providing persistent volume functionality are disclosed. A storage container having a virtual storage volume to be persisted across multiple applications is created. The multiple applications hosted in one or more application containers. The storage container is placed within a virtual machine object. The virtual machine object containing the storage container is stored in a computer-readable memory as a persistent virtual storage volume.

20 Claims, 11 Drawing Sheets

(56) References Cited

U.S. PATENT DOCUMENTS

| | | | | |
|---|---|---|---|---|
| 2016/0306862 | A1* | 10/2016 | Sitsky | G06F 9/445 |
| 2018/0144263 | A1* | 5/2018 | Saxena | G06F 9/542 |
| 2019/0266496 | A1* | 8/2019 | Florissi | G06Q 20/065 |
| 2020/0159557 | A1* | 5/2020 | Pasupathy | H04L 67/1097 |
| 2020/0301947 | A1* | 9/2020 | Botev | G06F 16/215 |
| 2021/0271427 | A1* | 9/2021 | Tewari | G06F 3/0653 |
| 2022/0335009 | A1* | 10/2022 | Paul | G06F 16/11 |

OTHER PUBLICATIONS

Benjamin Wootton, "Stateless vs Stateful Containers: What's the Difference and Why Does It Matter?", Contino, available online at <https://www.contino.io/insights/stateless-vs-stateful-containers-whats-the-difference-and-why-does-it-matter>, Oct. 22, 2018, 9 pages.

Chris Evans, "Docker Containers And Persistent Storage: 4 Options", Network Computing, available online at <http://www.networkcomputing.com/data-centers/docker-containers-and-persistent-storage-4-options>, Oct. 19, 2016, 5 pages.

Docker, "Docker Documentation", available online at <https://docs.docker.com/>, 2020, 6 pages.

Docker, "Open Source Projects", available online at <https://www.docker.com/community/open-source>, 2020, 3 pages.

Github, "Container Storage Interface (CSI)", available online at <https://github.com/container-storage-interface/spec/blob/master/spec.md#rpc-interface>, 2020, 79 pages.

Github, "HPE SimpliVity Volume Plugin for Docker", available online at <https://github.com/HewlettPackard/Docker-SimpliVity-Volume-Plugin>, May 15, 2020, 3 pages.

HPE, HPE SimpliVity Persistent Volume Plugin for Docker, Reference Guide, Jan. 2020, 9 pages.

Jenny Fong, "Docker 101: Introduction to Docker webinar recap", Docker Blog, available online at <https://www.docker.com/blog/docker-101-introduction-docker-webinar-recap/>, Aug. 3, 2017, 5 pages.

* cited by examiner

PERSISTENT VOLUME PLUGIN FOR CONTAINERS

BACKGROUND

A data container ("container") is an object which commonly houses one or more applications including all the dependencies, configuration files, libraries, and binary files required to execute the application(s) in a computing environment. Packaging one or more applications within a container allows the application(s) to be executed on different computing environments and/or to be moved from one computing environment to another. Further, a data container can be created that allows multiple application containers to access the same data. The application containers can be created, moved, or destroyed without affecting the data. Thus, data held in containers is "stateless" in the sense that the data will be identical no matter how many times it is iterated across different operating systems and applications. For these and other reasons, containers are used widely in computing environments.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
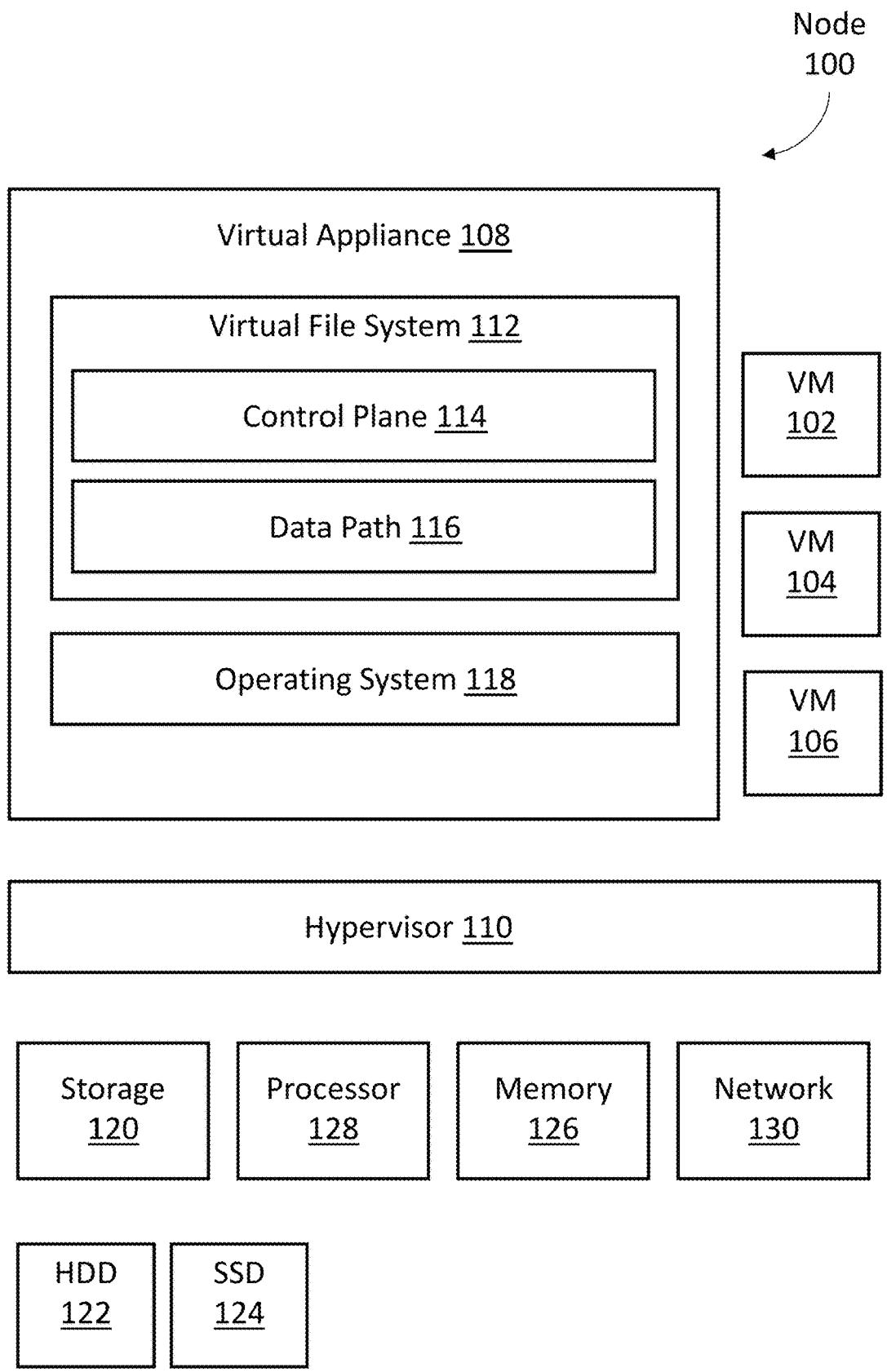
FIG. 1 is a schematic block diagram of one embodiment of a node that can provide a plugin module to generate persistent volumes for containers in a virtualized storage environment.

Described herein are exemplary systems and methods to implement a persistent volume plugin for containers, e.g., in a hyperconverged storage system. In the following description, numerous specific details are set forth to provide a thorough understanding of various examples. However, it will be understood by those skilled in the art that the various examples may be practiced without the specific details. In other instances, well-known methods, procedures, components, and circuits have not been illustrated or described in detail so as not to obscure the examples.

A persistent volume for a storage container refers to a mechanism by which data stored in an ephemeral, short-lived virtual container can be persisted over a longer period by utilizing an associated host structure. For example, in some embodiments, a virtual machine can be provided to wrap the storage container and provide a longer life cycle. Wrapping the storage container with a virtual machine can also provide additional data processing/handling functionality as compared to the storage container alone. In one embodiment, a persistent storage container is persisted across multiple applications that can be in one or more application containers Additional structure, referred to herein as a consistency group, can also be provided to group multiple containers within a single virtual machine wrapper. This can allow the wrapped multiple containers to be operated on consistently, details of which are provided below.

Data may be stored on computing systems, such as servers, computer appliances, workstations, storage systems or storage arrays, converged or hyperconverged systems, or the like. Computing systems connected by a network may also be referred to as nodes. To store data, some computing systems may utilize a data virtualization platform that abstracts aspects of the physical storage hardware on which the data is physically stored (e.g., aspects such as addressing, configurations, etc.) and presents virtualized or logical storage to a user environment (e.g., to an operating system, applications, processes, etc.). The virtualized storage may be pooled from multiple storage hardware (e.g., hard disk drives, solid state drives, etc.) into a data store, out of which the virtualized or logical storage may be provided. The data virtualization platform may also provide data services such as deduplication, compression, replication, and the like.

In some implementations, data virtualization may be instantiated, maintained, and managed by, at least in part, a virtual controller (or virtual appliance). A virtual controller may be a virtual machine (VM) instance executing on hardware resources, such as a processor and memory, with specialized processor-executable instructions to establish and maintain virtualized storage according to various examples described herein. In such instances, the virtual controller may be operating alongside guest virtual machines (also called client or user virtual machines), and on a same hypervisor or virtual machine manager as the guest virtual machines for example.

In some instances, the data virtualization platform may be object-based. An object-based data virtualization platform may differ from block level storage (e.g., implemented in storage area networks and presented via a storage protocol such as iSCSI or Fibre Channel) and file level storage (e.g., a virtual file system which manages data in a file hierarchy and is presented via a file protocol such as NFS or SMB/CIFS), although an object-based data virtualization platform may underlie block or file storage protocols in some implementations.

Components of an example object-based data virtualization platform may include a flat object store and one or more file system instances (also referred to as "hives"), among other things. As used herein, the term "hive" refers to a dataset including data and an associated tree structured file system.

Data may be stored as objects in the object store. For example, user accessible files and directories may be made up of multiple data objects. The object store may also store metadata objects related to the operation of the data virtualization platform, as will be described below. In an example, objects may be of a predetermined fixed size in the object store (e.g., 4 kib or 8 kib for data objects and 1 kib for metadata objects).

Each object may be identified by a signature (also referred to as an object fingerprint), which, in some implementations, may include a cryptographic hash digest of the content of that object. An object index can correlate the signature of an object in the object store to a physical address of the object's content (i.e., a physical address on storage hardware such as disk).

A file system instance may refer to an organization of metadata objects and data objects that relate the data objects hierarchically to a root object. Thus, a file system instance may be identified by its root object. For example, the file system instance may be a Merkle tree or any other hierarchical arrangement (e.g., directed acyclic graphs, etc.). In the case of a hierarchical Merkle tree, data objects may be located at the lowest tree level of any branch (that is, most distant from the root object) and may also referred to as leaf data objects. A parent object includes as its content the signatures of child objects.

For example, a parent object of leaf data objects is a metadata object that stores as its content the signatures of its child leaf data objects. The root object and other internal objects of a tree may also be metadata objects that store as content the signatures of respective child objects. A metadata object may be able to store a number of signatures that is at least equal to a branching factor of the hierarchical tree, so that it may hold the signatures of all of its child objects.

In example implementations, data of one or more guest virtual machines may be stored by one or more file system instances (e.g., one guest VM using storage from multiple file system instances, many guest VMs using storage from a file system instance, or any variation in between). In an example, each guest virtual machine may be associated with a respective file system instance on a one-to-one basis. The data virtualization platform may export a file protocol mount point (e.g., an NFS or SMB mount point) by which a guest virtual machine can access the storage provided by a file system instance via the namespace of the file protocol.

In other implementations, a file system instance may be associated with and accessed for other units of storage, such as a block volume, a network attached storage share, a container volume, etc. In some implementations, objects in an object store may be referenced more than once in a single file system instance or may be referenced multiple times in file system instances. Thus, the multiply referenced object can be stored once but referenced many times to provide deduplication.

FIG. 1 is a schematic block diagram of one embodiment of a node a plugin module to generate persistent volumes for containers in a virtualized storage environment. Node 100 can be, for example, a hyperconverged infrastructure node with a software-centric architecture that tightly integrates compute, storage, networking and virtualization resources and other technologies. Node 100 can host any number of guest virtual machines (VMs) 102, 104 and 106, and can be configured to produce local and remote backups and snapshots of the virtual machines. In some examples, a plurality of such nodes may be arranged in a network as described below.

In some examples, node 100 can include virtual appliance 108 and hypervisor 110. Virtual appliance 108 can include virtual file system 112 in communication with control plane 114 and data path 116. Control plane 114 can handle data flow between applications and resources within node 100. Data path 116 can provide a suitable I/O interface between virtual file system 112 and operating system (OS) 118, and can also enable features such as data compression, deduplication, and optimization.

Node 100 can also include hardware components managed by hypervisor 110. For example, node 100 can include storage 120 which can be a RAID storage controller or a host bus adapter having connections to a number of hard disk drives (HDDs) 122 and/or solid state drives (SSDs) 124. As described in greater detail below, in various embodiments, storage 120 can function support to a plugin module to generate persistent volumes for containers in a virtualized storage environment.

Node 100 can also include memory 126 (e.g., RAM, ROM, flash, etc.) and one or more processors 128. Node 100 can also include wireless and/or wired network interface components 130 to enable communication with other nodes. In some embodiments, nodes can also include an accelerator card, which can provide compute offload and/or non-volatile RAM (not illustrated in FIG. 1).

Figure 2:
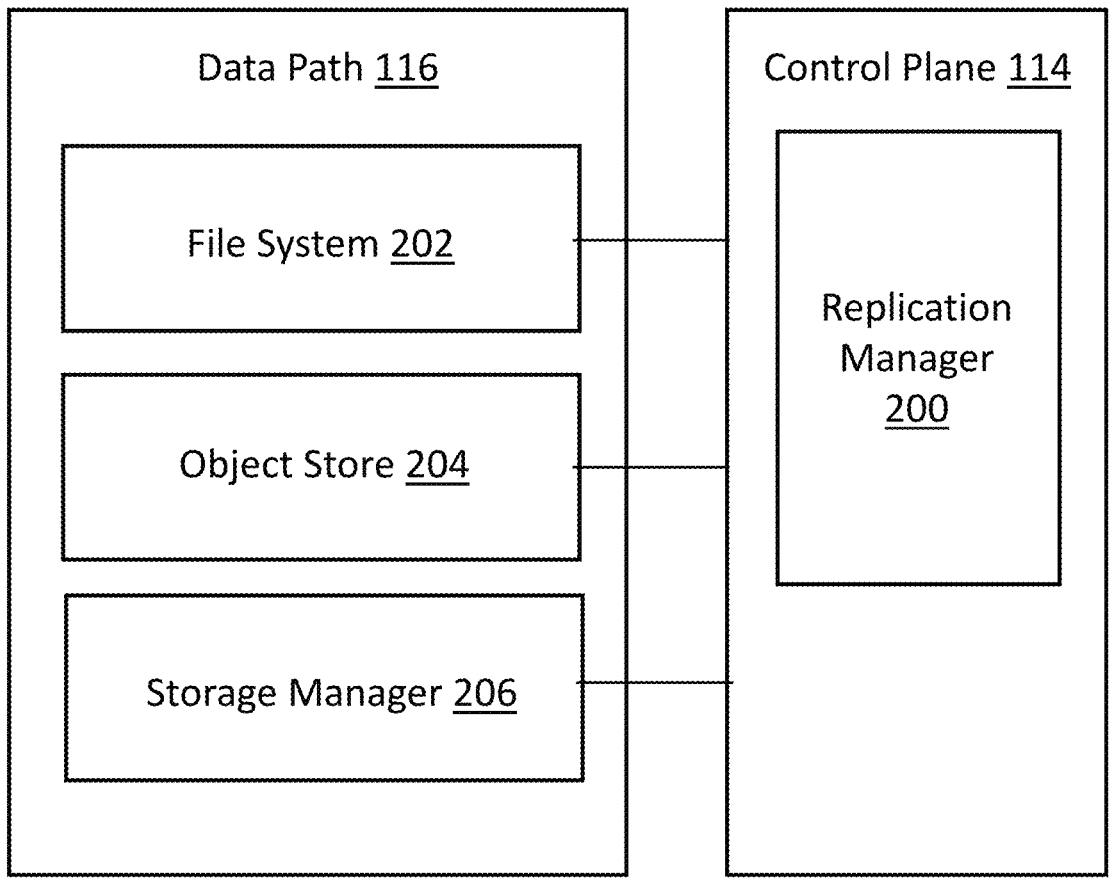
FIG. 2 illustrates an example embodiment of a data path that can be used in association with a plugin module to generate persistent volumes for containers in a virtualized storage environment.
Figure 2:
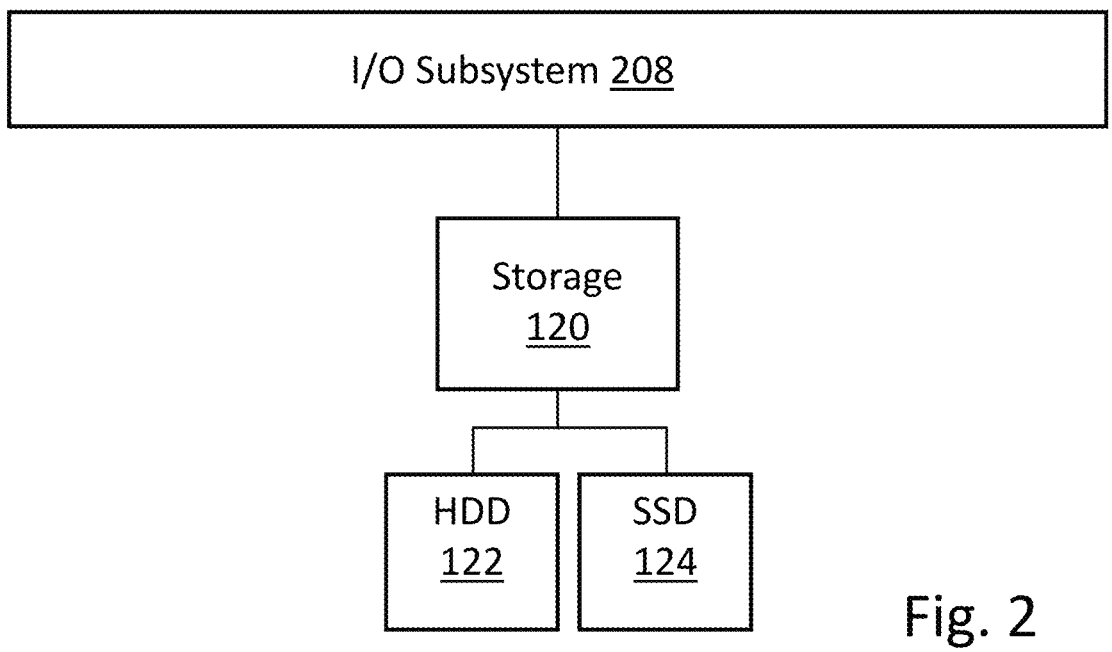

FIG. 2 illustrates an example embodiment of a data path that can be used in association with a plugin module to generate persistent volumes for containers in a virtualized storage environment. In various embodiments, data path 116 may communicate with replication manager 200 configured to perform at least remote backup operations. Data path 116 can also include file system 202 in communication with control plane 114. In one embodiment, file system 202 is responsible for managing file system components within data path 116 such as by instantiating file system components, maintaining directories and files within those directories, and the like.

File system 202 may also determine I/O processing capabilities of the node, and implement high availability by, for example, mirroring data writes from the primary node (e.g., node 100) to a secondary node. File system 202 further provides both synchronous and asynchronous data transfer interfaces for various components within data path 116. Object store 204 and storage manager 206 are responsible for data object I/O operations between data path 116 and I/O subsystem 208. As described in greater detail below, I/O subsystem 208 can support a plugin module to enable a user to generate persistent volumes for containers in a virtualized storage environment As described above, a data container ("container") is an object which commonly houses one or more applications including all the dependencies, configuration files, libraries, and binary files required to execute the application(s) in a computing environment. Packaging one or more applications within a container allows the application(s) to be executed on different computing environments and/or to be moved from one computing environment to another. Further, a data container can be created that allows multiple application containers to access the same data. The application containers can be created, moved, or destroyed without affecting the data. Thus, data held in containers is "stateless" in the sense that the data will be identical no matter how many times it is iterated across different operating systems and applications.

Containers need a storage infrastructure that can provide persistent storage for data when the application(s) in the container are executing and can also provide data services (e.g., data protection, cloning, backup, restore, and workload centric policies) to the data. Some virtualized computing environments provide storage for the data in a virtual machine disk (VMDK) object, which is an abstraction of physical storage. The virtual machine disk objects may be provisioned within a datastore under a single, high-level directory. However, because data services are commonly provided at the virtual machine (VM) level, some virtualized environments cannot readily provide data services to the virtual machine disk objects associated with containers.

Subject matter described herein addresses these and other issues by providing techniques and infrastructure that may be implemented as a plugin module to enable a user to generate persistent volumes for containers in a virtualized storage environment. In some examples, when a persistent volume is requested for a container, a virtual machine is created and the container is "wrapped" by the virtual machine. In one embodiment, the storage container object (or storage container volume) is wrapped by a virtual machine descriptor (wrapper VM). Because data services are already provided at the VM level, the VM wrapping (or association) with a thin VM descriptor (the wrapper VM) around the persistent volume (PV), or a group of PVs in the case of a consistency group (CG), allows data services to be applied to the PV or CG.

In some examples a metadata file is also created and used to store information about the container and to keep track of which container(s) may be using that virtual machine. In some examples a similar approach can be used to import existing virtual machine disks into a container environment.

Figure 3:
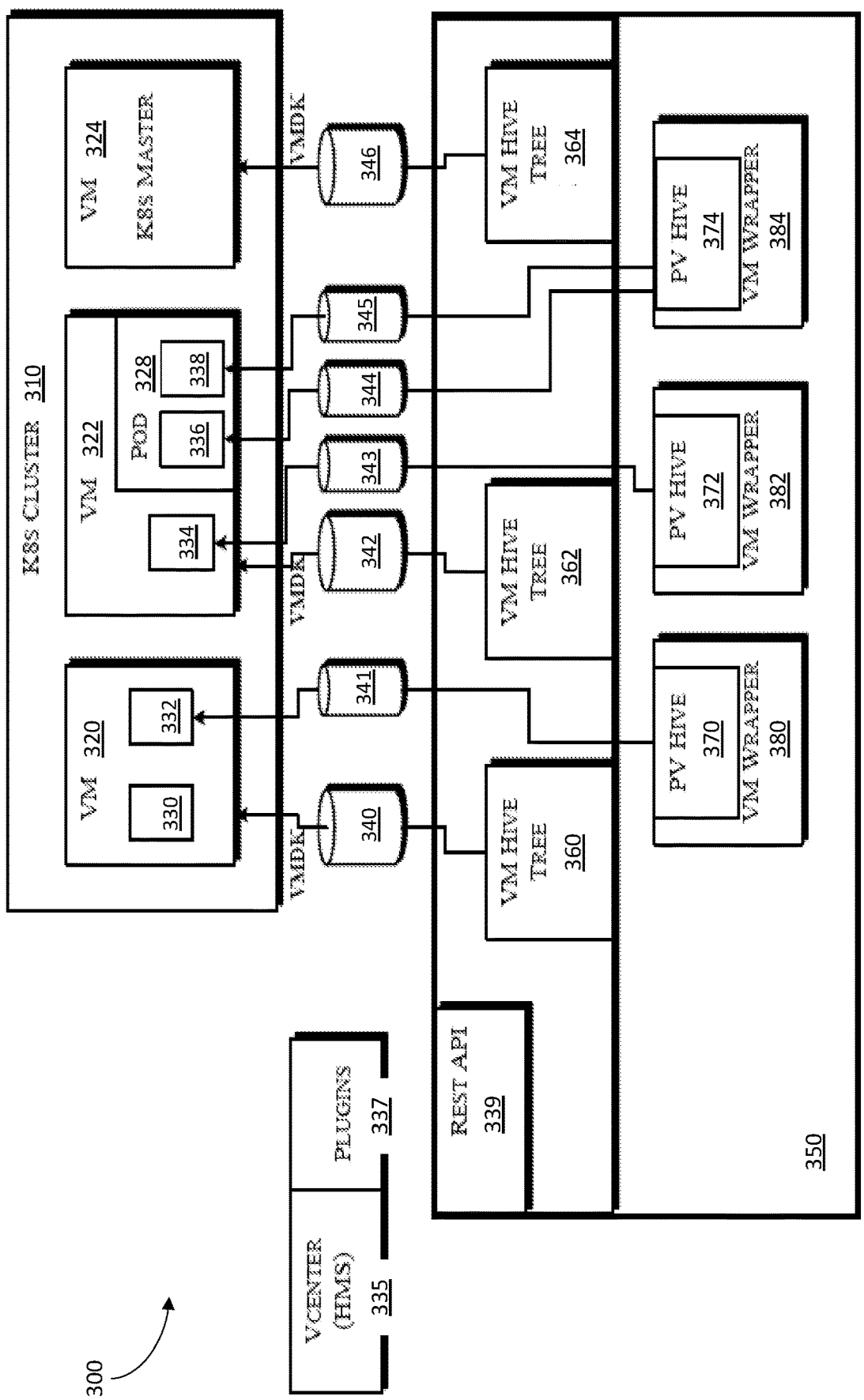
FIG. 3 is a block diagram of one embodiment of an operating environment that can provide persistent volume plugins for containers.

FIG. 3 is a block diagram of one embodiment of an operating environment that can provide persistent volume plugins for containers. As described above, containers are fast and light-weight in terms of deployment and portability from one infrastructure to another. Containers are also short-lived and ephemeral in nature. However, utilizing the techniques and architectures described herein, containers can function to persist data when they are running or in operation. These are persistent volumes (PVs). That is, an infrastructure is provided that can provision storage to the container(s) during run-time.

The example embodiment of FIG. 3 is a container orchestration environment that can be hosted on a platform having multiple virtual machines. In the example embodiment, the containers or pods of containers are running within a Kubernetes (K8s) cluster within the virtual machines. The architecture of FIG. 3 allows storage for container host virtual machines and storage for other containers to be served from the same underlying infrastructure/file system. In some embodiments, provisioning of new, and importing of existing, storage objects can be supported utilizing the plugin approach described.

In some examples the persistent volume may be assigned to a consistency group, which may be specified by the user or originator of a request to create a persistent volume. In some examples the virtual machine object may be the only entity in the consistency group, while in other examples there may be multiple entities in the consistency group. In some examples, when a consistency group is specified in the request the container may be placed in the same virtual machine folder/hive as specified in the request.

In the example of FIG. 3, system 300 can be, for example, a node of a distributed system. In the context of the present example, system 300 has a software-centric architecture that integrates compute, storage, networking and virtualization resources and other technologies.

In various embodiments, within the virtual environment of system 300, persistent storage can be provisioned to the container in the form of a VMDK object (e.g., 340-346), which is functionally an abstraction of the physical storage. These VMDK objects can be provisioned within a data store under, for example, a high-level directory. In addition to persisting data, data services (e.g., data protection, data portability) for the persistent container storage can be provided.

In some operating environments data services operate at the virtual machine or virtual machine folder level, so there is no native support for standalone VMDK objects that are created on datastores for containers. Techniques and architectures described herein can function to leverage native data services as described to achieve features like consistency groups (for distributed architectures where multiple data objects are protected at the same time).

In the example of FIG. 3, data services can operate at the VM level and each container storage object/volume can be wrapped by a virtual machine. One example embodiment of a technique for generating and maintaining a persistent volume for a container is provided in FIG. 4. In one embodiment, when a persistent volume is requested for a container, a virtual machine is created with the requested volume as a VMDK object that is part of the virtual machine. In some embodiments, a metadata file is also created with each persistent storage volume to store information about the storage volume and to track the containers and container hosts utilizing the corresponding VMDK object.

System 300 may be implemented as a physical server or other suitable computing device. In the present example, system 300 hosts a number of guest virtual machines (VMs) 320, 322 and 324, and can be configured to produce local and remote backups and snapshots of the virtual machines. In some embodiments, multiple of such nodes, each performing object cache processing and master object index processing (such as that described above), may be coupled to a network and configured as part of a cluster.

Various components of system 300 can also enable features such as data compression, deduplication, and optimization. According to one embodiment a virtual controller can be configured to run storage stack software (not shown) that may be used to perform functions such as managing access by VMs 320, 322 and 324 to datastore 350, providing dynamic resource sharing, moving VM data between storage resources, providing data movement, and/or performing other hyperconverged data center functions.

In the example embodiment of FIG. 3, cluster 310 can be, for example, a Kubernetes (K8s) cluster and can include any number of virtual machines (e.g., 320, 322, 324). Kubernetes is an open source container orchestration architecture for managing application deployment and management. Kubernetes can be utilized with container tools such as Docker (or other similar tools) to manage containers. Kubernetes is available from the Cloud Native Computing Foundation and Docker is a virtualization and container tool available from Docker, Inc. One virtual machine (e.g., 324) can function as the Kubernetes cluster master. Alternative, non-Kubernetes embodiments can also be supported. Similarly, alternative, non-Docker embodiments can also be supported.

In various embodiments, each VM can host one or more containers (e.g., 330 and 332 on VM 320, 334, 336, 338 on VM 322). VMs can also host one or more pods (e.g., 328 on VM 322), which are groups of containers with shared storage configurations. In some embodiments, a hypervisor management system (HMS) 335 can function to manage and monitor hardware resources within system 300. HMS 337 can utilize one or more plugins (e.g., 337) to interact with memory system 350 via application program interface (API) 339. Other configurations can also be supported.

In various embodiments, each VM has a corresponding VMDK object that can operate as a VM hive tree (e.g., 360 to VM 320, 362 to VM 322, 364 to VM 324). Further, containers can have corresponding persistent volume hives with VM wrappers (e.g., 370 and 380 to container 332, 372 and 382 to container 334, 374 and 384 to containers 336 and 338 in pod 328). In the example of FIG. 3, persistent volume hives are maintained separately from the corresponding container-hosting VM.

In one embodiment, data services for VM storage hives include provisioning (on any cluster and datastore), cloning, backup (to any cluster), restoring (at any cluster and datastore), and workload centric policies (e.g., high availability, compression, backup frequency, retention). In alternate embodiments, different combinations of data services can be provided at the VM storage hive level.

In one embodiment, data services for container persistent volume hives include importation, provisioning, cloning (e.g., continuous integration/continuous deployment TI/CD', test and development), backup (local and/or remote), restore (backup and/or remote), and workload centric policies (e.g., high availability, compression, backup frequency, retention). In alternate embodiments, different combinations of data services can be provided at the container persistent volume hive level.

As utilized in the example of FIG. 3, the concept of a hive corresponds to a VM or a backup object. In one embodiment, when data protection operations are initiated on a VM all the contents of the hive or VM folder are backed up/restored/cloned at the same time. As a result, there is consistency between the various objects within the hive or VM folder. Techniques related to backup and restore functionality are provided in FIGS. 7, 8 and 9.

System 300 can provide consistency across various container storage objects (e.g., VMDKs), which provides backup, restore and clone support for container persistent volumes and standalone VMDK objects on a datastore. System 300 can also provide the ability to create consistency groups (CGs) for container persistent volumes on a datastore by leveraging the hive concept. Various uses of CGs are described in FIGS. 6 and 8-11.

In one embodiment, when a persistent volume is created for a container, the persistent volume is automatically assigned to a consistency group in which that persistent volume is the only entity. In some embodiments, when a persistent volume is created for a container, the user (or other entity) can specify the consistency group to which the new persistent volume should belong. This can be any pre-existing consistency group.

In one embodiment, when a consistency group is specified, the corresponding container storage object is placed in the same VM folder/hive as previous container volumes for the consistency group. In various embodiments, when a data operation is triggered at the consistency group level (e.g., specified by a user explicitly), all persistent volume objects in the specified VM folder/hive can be operated on concurrently. Depending on whether a data operation is executed at a consistency group level or a single container storage object level, cleanup activities are performed accordingly (e.g., deleting non-required items post-operation).

In one embodiment, each Persistent volume in a CG-VM has its own metadata file. Thus, each metadata file contains CG information to which it belongs.

Figure 4:
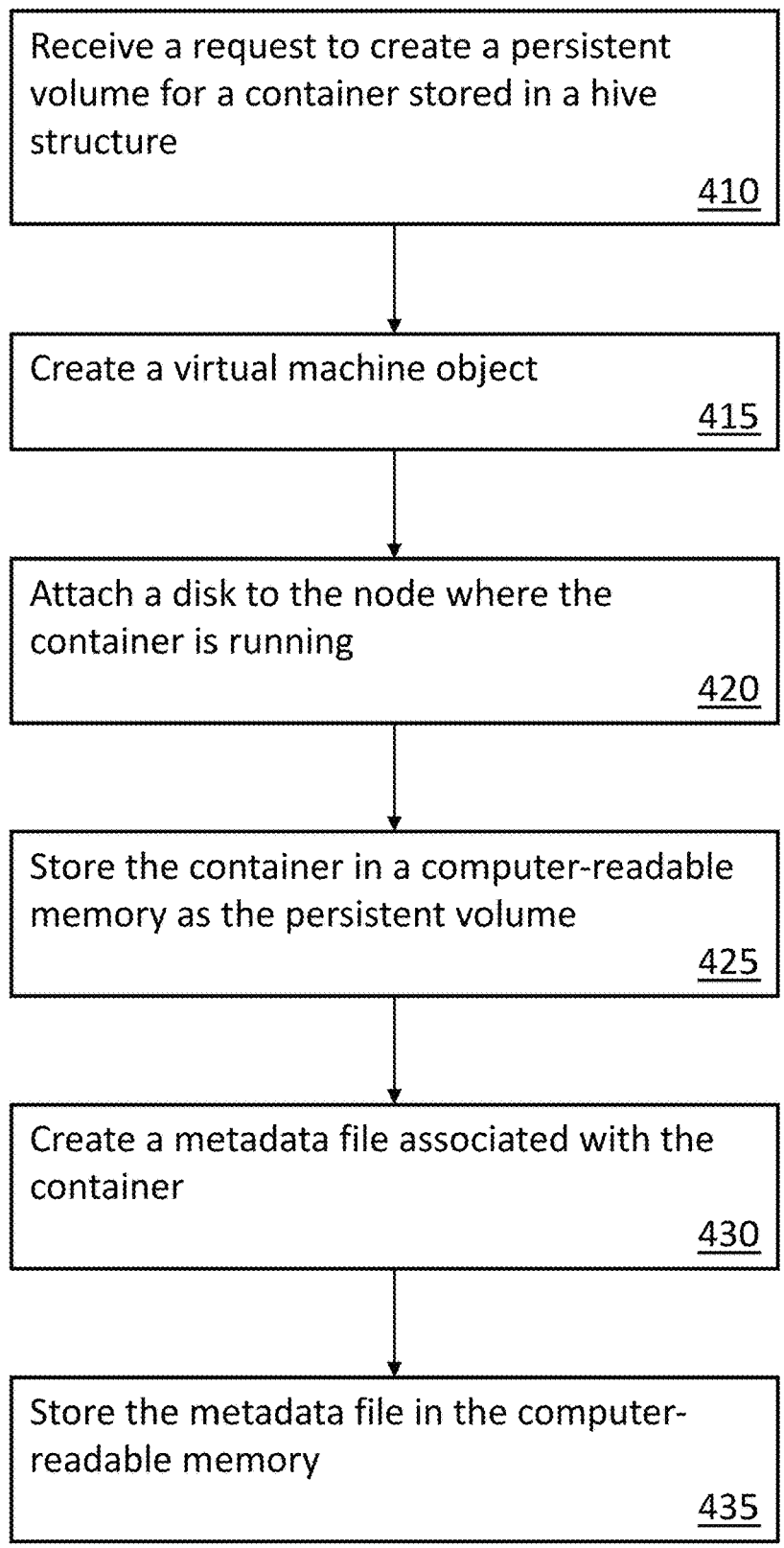
FIG. 4 is a flow diagram of one embodiment of a method to implement a persistent volume plugin for containers.

FIG. 4 is a flow diagram of one embodiment of a method to implement a persistent volume plugin for containers. In some examples, the operations depicted in FIG. 4 may be implemented in a computing by a processing element in a computing environment, such as the system 300 depicted in FIG. 3.

In one embodiment, a request is received to create a persistent volume for a container stored in a hive structure (block 410). In some examples, the request may be received from a user via a human user interface or from a process executing in a virtualized computing environment.

In one embodiment, a virtual machine object is created (block 415), and a disk is attached to the node where the container is running (block 420). The newly-created VM is used to wrap the newly-created persistent volume (for example, as described and illustrated in FIG. 3). In one embodiment, the container state (or container storage) is stored in a computer readable memory (block 425) as the persistent volume.

A metadata file associated with the virtual machine object is created (block 430). In some examples the metadata file may be used to store information about the virtual machine object and to track the container(s) and the host(s) utilizing the container(s). The metadata files are stored in the computer readable memory with the virtual machine object (block 435).

Figure 5:
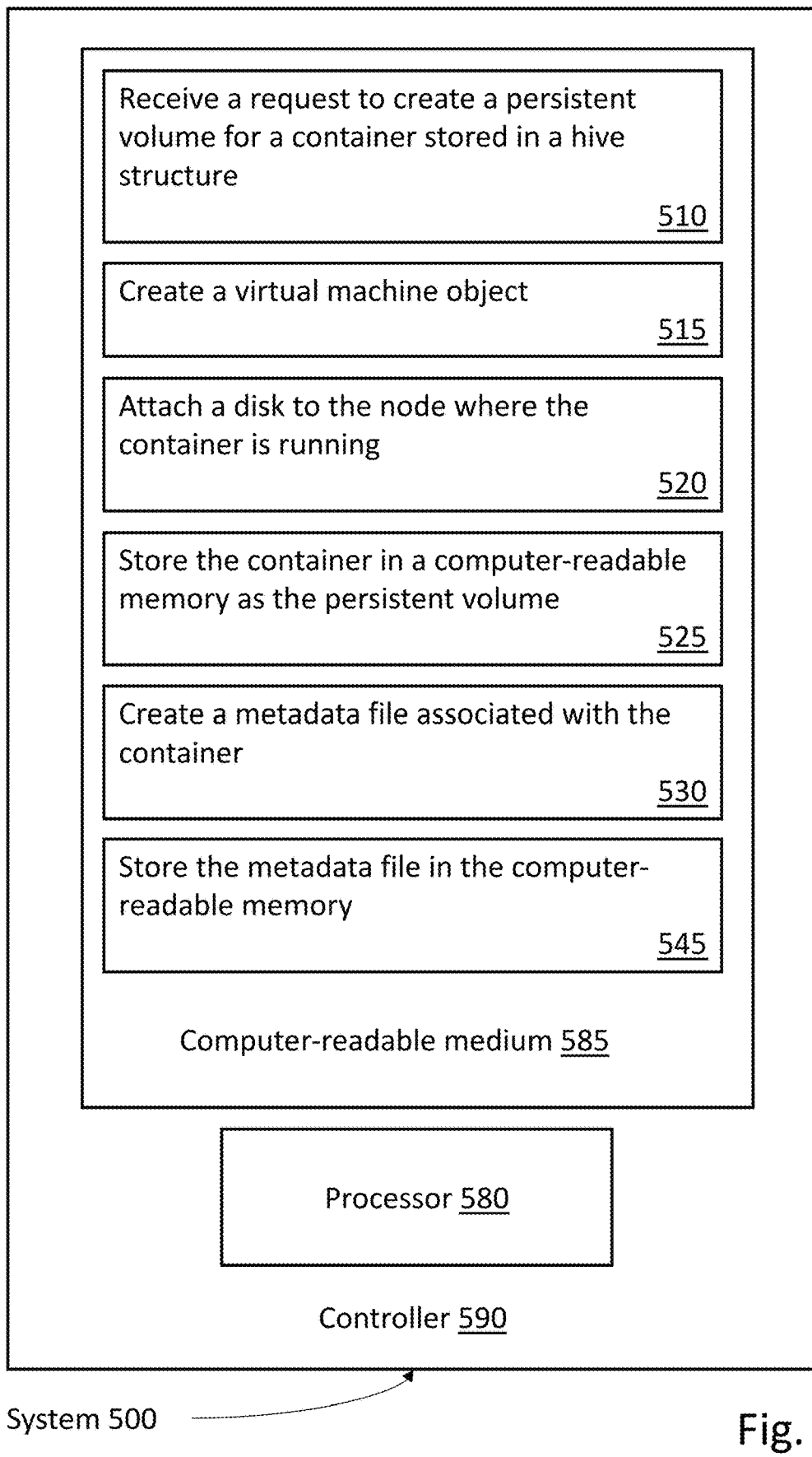
FIG. 5 is a block diagram of one embodiment of a system to implement a persistent volume plugin for containers.

FIG. 5 is a block diagram of one embodiment of a system to implement a persistent volume plugin for containers (e.g., 337 of FIG. 3). In the example of FIG. 5, system 500 includes processor 580, computer readable medium 585 communicatively coupled, for example, through a system bus. In one embodiment, processor 580 and computer readable medium 585 can be controller 590 within system 500.

Processor 580 may be any type of processor, or processing logic that interprets and executes machine-readable instructions stored in computer readable storage medium 585. Computer readable storage medium 585 may be a random access memory (RAM) or another type of dynamic storage device that may store information and computer readable instructions that may be executed by processor 580.

For example, computer readable storage medium 585 may be Synchronous DRAM (SDRAM), Double Data Rate (DDR), Rambus DRAM (RDRAM), Rambus RAM, non-volatile memory (NVM), etc. or storage memory media such as a floppy disk, a hard disk, a CD-ROM, a DVD, a pen drive, and the like. In some examples, computer readable storage medium 585 may be a non-transitory computer-readable medium. In some examples, computer readable storage medium 585 may be remote but accessible to system 500.

Computer readable storage medium 585 may store instructions 510, 515, 520, 525, 530 and 545. In some examples, instructions 510 may be executed by processor 580 to receive a request to create a persistent volume for a container stored in a hive structure.

Instructions 515 may be executed by processor 580 to create a virtual machine object is created, and instructions 520 may be executed by the processor 580 to attach the disk to the node where the container is running Instructions 525 may be executed by the processor 580 to store the virtual machine object comprising the container in a computer readable memory as the persistent volume requested.

Instructions 530 may be executed by the processor 580 to create a metadata file associated with the virtual machine object created by executing the instructions at 515. In some examples the metadata file may be used to store information about the virtual machine object and to track the container(s)

and the host(s) utilizing the container(s). Instructions 545 may be executed by the processor 580 to store the metadata files created by executing the instructions at 530 in the computer readable memory with the virtual machine object.

Figure 6:
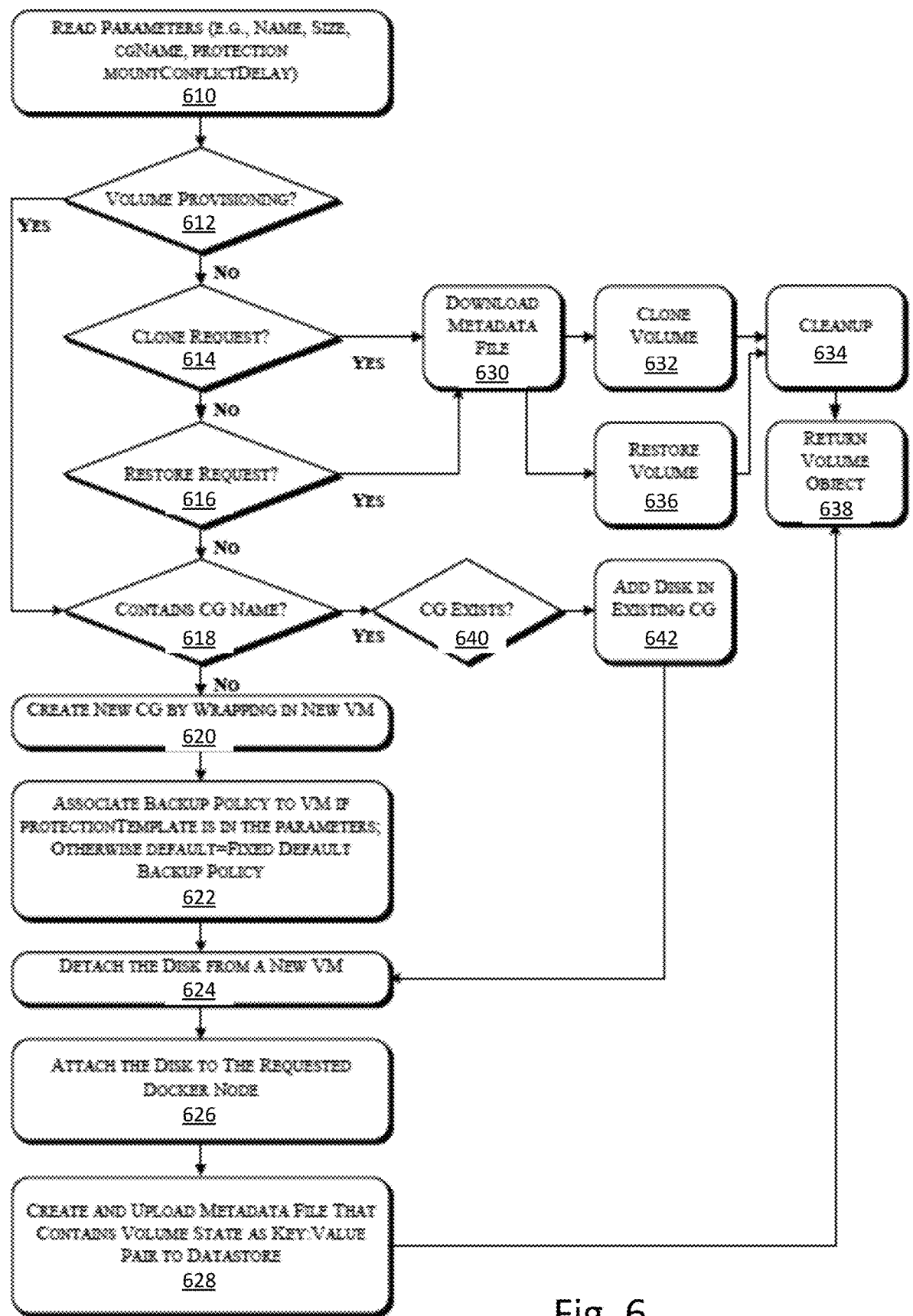
FIG. 6 is a flow diagram of one embodiment of a provisioning workflow to utilize a persistent volume plugin for containers to generate and utilize consistency groups.

FIG. 6 is a flow diagram of one embodiment of a provisioning workflow to utilize a persistent volume plugin for containers to generate and utilize consistency groups. The example of FIG. 6 can provide the functionality of enabling and utilizing consistency groups for container storage. The functionality described with respect to FIG. 6 can be provided, for example, by the architecture of FIG. 3.

In general, when a persistent volume is created for a container, the persistent volume can be assigned to a consistency group (CG) in which it can be the only entity. In some embodiments, when the persistent volume is created, a user (or other entity) can have the ability/option to specify the consistency group to which the newly created persistent volume should belong. This can be a pre-existing CG having previously-created container volumes.

In one embodiment, when a CG is specified, the corresponding (or other object) can be placed in the same VM folder/hive as the previously-created and assigned container volume. During operation, if a data operation is triggered at the CG level all of the persistent volume objects in that VM folder/hive are operated on at the same time. In some embodiments, depending on whether a data service is executed at the CG level (versus a single container storage object level), cleanup activities can be performed accordingly (e.g., deleting non-required items, post operation). In some embodiments, each volume in a CG-VM has its own metadata file.

In one embodiment, to create a new persistent volume, the volume parameters are read or otherwise acquired (block 610). The parameters can include, for example, a name, a size, CG name, etc. If the volume creation does not require volume provisioning (block 612) and it is a clone request (block 614), the metadata file for the object to be cloned is downloaded (block 630), the volume is cloned (block 632), cleanup is performed (block 634), and the volume object is returned (block 638). One embodiment for a technique to utilize a persistent volume plugin for containers to clone a consistency group on a remote cluster is provided in greater detail in FIG. 9.

If the volume creation does not require volume provisioning (block 612), and it is not a clone request (block 614), and is a restore request (block 616), the metadata file for the object to be restored is downloaded (block 630), the volume is restored (block 636), cleanup is performed (block 634), and the volume object is returned (block 638). One embodiment for a technique to utilize a persistent volume plugin for containers to restore a consistency group on a remote cluster is provided in greater detail in FIG. 8.

If the volume requires volume provisioning (block 612), and the request contains a CG name (block 618), and the CG exists (block 640), the disk is added to the existing CG (block 642). The disk is detached from a new VM (block 624) and the disk is attached to the requested container (block 626). In one embodiment, a metadata file that contains the volume state at a key-value pair is created and uploaded to the datastore (block 628) and the volume object is returned (block 638).

If the volume requires volume provisioning (block 612), and the request does not contain a CG name (block 618), a new CG is created by wrapping the new volume in a new VM (block 620), and a backup policy is associated with the new VM if specified in the initial parameters (block 622).

Figure 7:
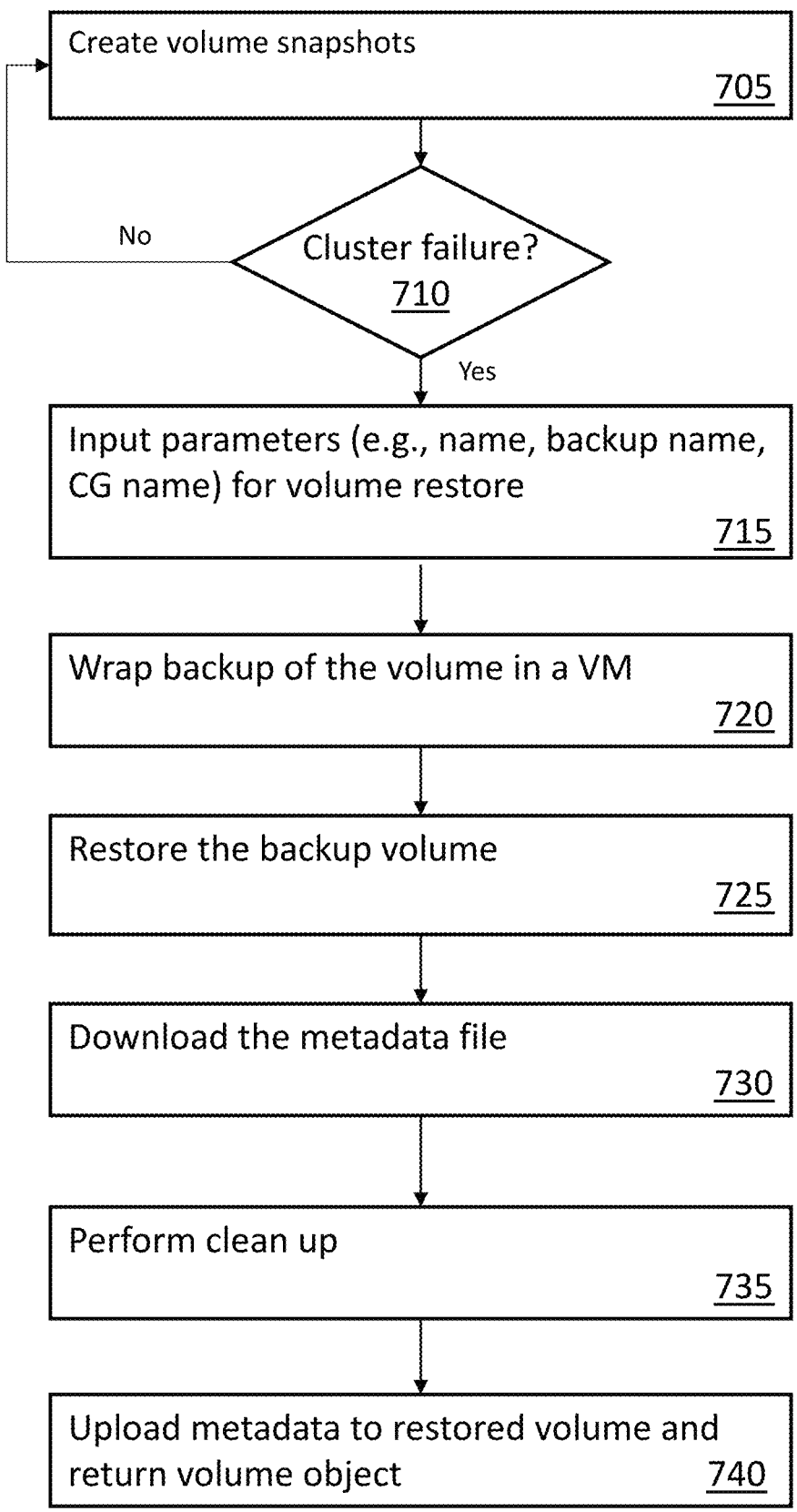
FIG. 7 is a flow diagram of one embodiment of a workflow to restore or clone a persistent volume plugin for containers.

One embodiment for a technique to generate a backup of a consistency group is provided in greater detail in FIG. 7.

The disk is detached from a new VM (block 624), and the disk is attached to the requested container (block 626). In one embodiment, a metadata file that contains the volume state at a key-value pair is created and uploaded to the datastore (block 628), and the volume object is returned (block 638).

FIG. 7 is a flow diagram of one embodiment of a workflow to restore or clone a persistent volume plugin for containers. The example of FIG. 7 can provide the functionality of restoring or cloning a volume. The functionality described with respect to Figure can be provided, for example, by the architecture of FIG. 3. In a Docker-based embodiment, within a Docker swarm, backups can be taken based on a backup policy associated with the volume during volume creation.

Volume snapshots are created (block 705). If there is no cluster failure (block 710), volume subsequent snapshots can be periodically created (block 705). If there has been a cluster failure (block 710), parameters for the volume to be restored are acquired (block 715). These parameters can include, for example, volume name, backup name, CG name, etc. Other and/or different parameters can also be utilized.

The backup of the volume is wrapped in a VM (block 720). The backup volume is then restored (block 725). The metadata file for the volume is downloaded (block 730), cleanup operations are performed, for example, renaming, editing the metadata file, etc. (block 735), and the metadata file is uploaded to the restored volume and the volume object is returned (block 740).

Figure 8:
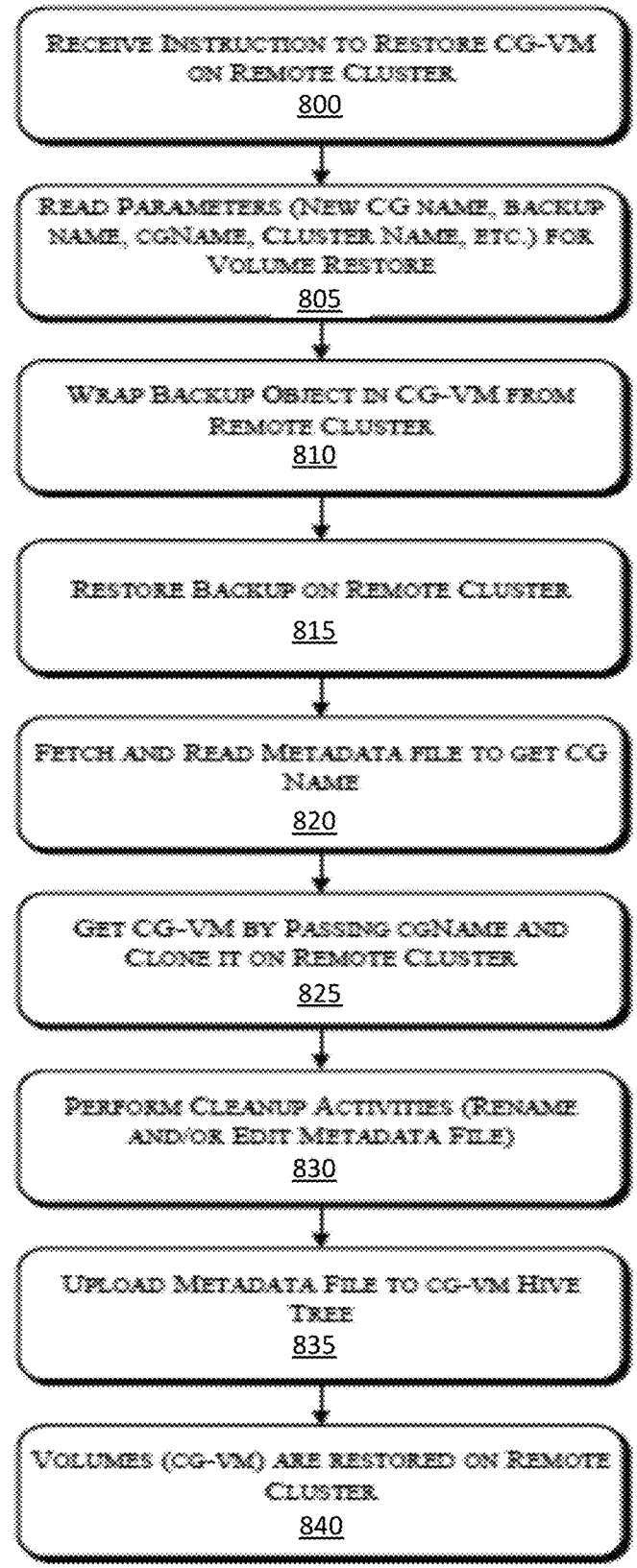
FIG. 8 is a flow diagram of one embodiment of a method to utilize a persistent volume plugin for containers to restore a consistency group virtual machine on a remote cluster.

FIG. 8 is a flow diagram of one embodiment of a method to utilize a persistent volume plugin for containers to restore a consistency group virtual machine on a remote cluster. The example of FIG. 8 can provide the functionality of restoring a volume at a remote site or cluster. In one embodiment, the backup policy can be specified during volume creation to generate scheduled backups. The functionality described with respect to FIG. 8 can be provided, for example, by the architecture of FIG. 3.

Instructions to restore a CG-VM on a remote cluster can be received (block 800). Parameters for the volume restore operation can be read/acquired (block 805). The parameters can include, for example, a new CG name, a backup name, a CG name, a cluster name, etc. Other and/or different parameters can also be supported. The backup object from the remote cluster can be wrapped in a VM (block 810). The wrapping of the backup object can be accomplished as described above.

The backup volume is restored on the remote cluster (block 815). A metadata file is fetched and read to get the CG name (block 820). The CG name can be passed to the remote cluster and the CG-VM cloned on the remote cluster (block 825). Cleanup activities can be performed (block 830). The cleanup activities can include, for example, renaming and/or editing the metadata file. The metadata file is then uploaded to the CG-VM hive tree (block 835), and the volumes are restored on the remote cluster (block 840).

Figure 9:
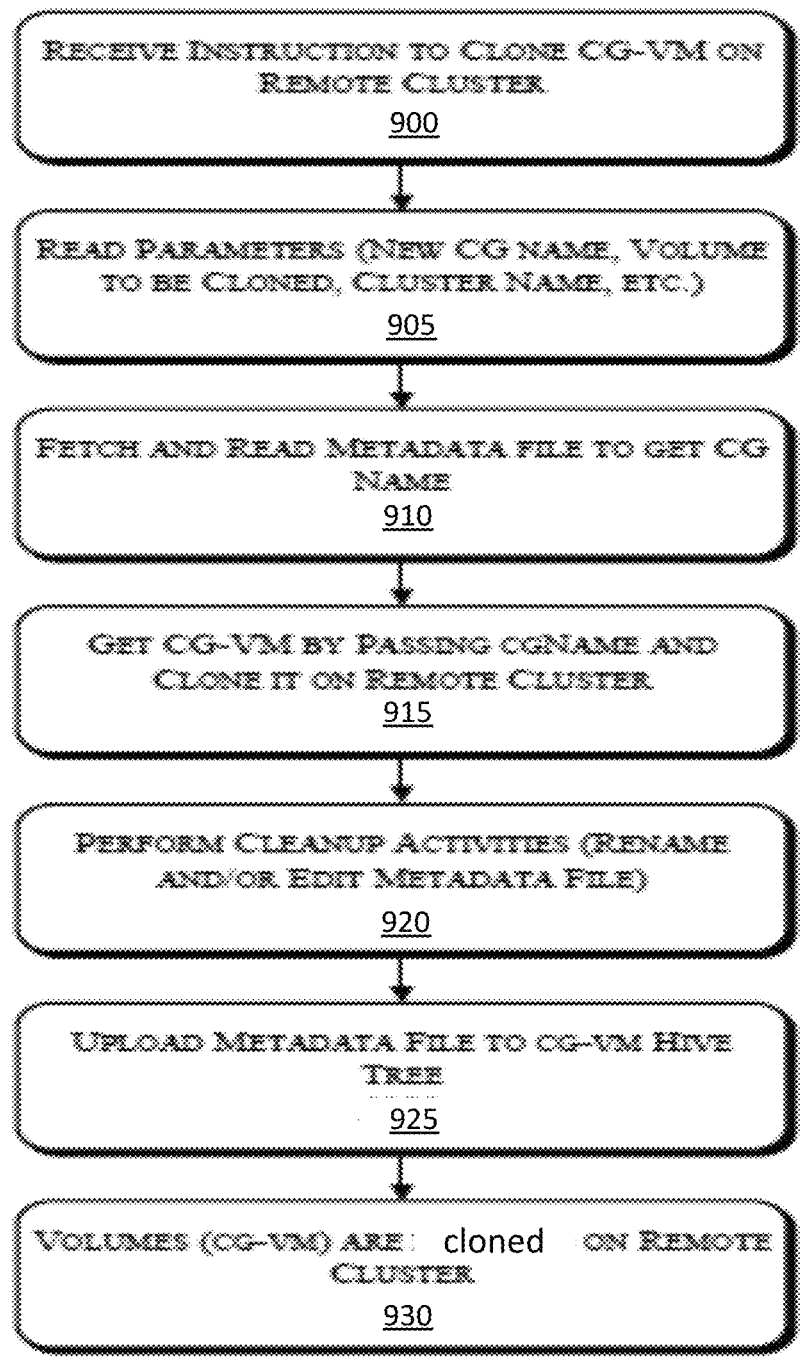
FIG. 9 is a flow diagram of one embodiment of a method to utilize a persistent volume plugin for containers to clone a consistency group virtual machine on a remote cluster.

FIG. 9 is a flow diagram of one embodiment of a method to utilize a persistent volume plugin for containers to clone a consistency group virtual machine on a remote cluster. The example of FIG. 9 can provide the functionality of cloning a volume at a remote site or cluster. As mentioned above, the backup policy can be specified during volume creation to generate scheduled backups. The functionality described with respect to FIG. 9 can be provided, for example, by the architecture of FIG. 3.

Instructions to clone a CG-VM on a remote cluster can be received (block 900). Parameters for the volume restore operation can be read/acquired (block 905). The parameters can include, for example, a new CG name, a backup name, a CG name, a cluster name, etc. Other and/or different parameters can also be supported.

The metadata file is fetched and read to get the CG name (block 910). The CG name can be passed to the remote cluster and the CG-VM cloned on the remote cluster (block 915). Cleanup activities can be performed (block 920). The cleanup activities can include, for example, renaming and/or editing the metadata file. The metadata file is uploaded to the CG-VM hive tree (block 925). The volume is cloned on the remote cluster (block 930).

Figure 10:
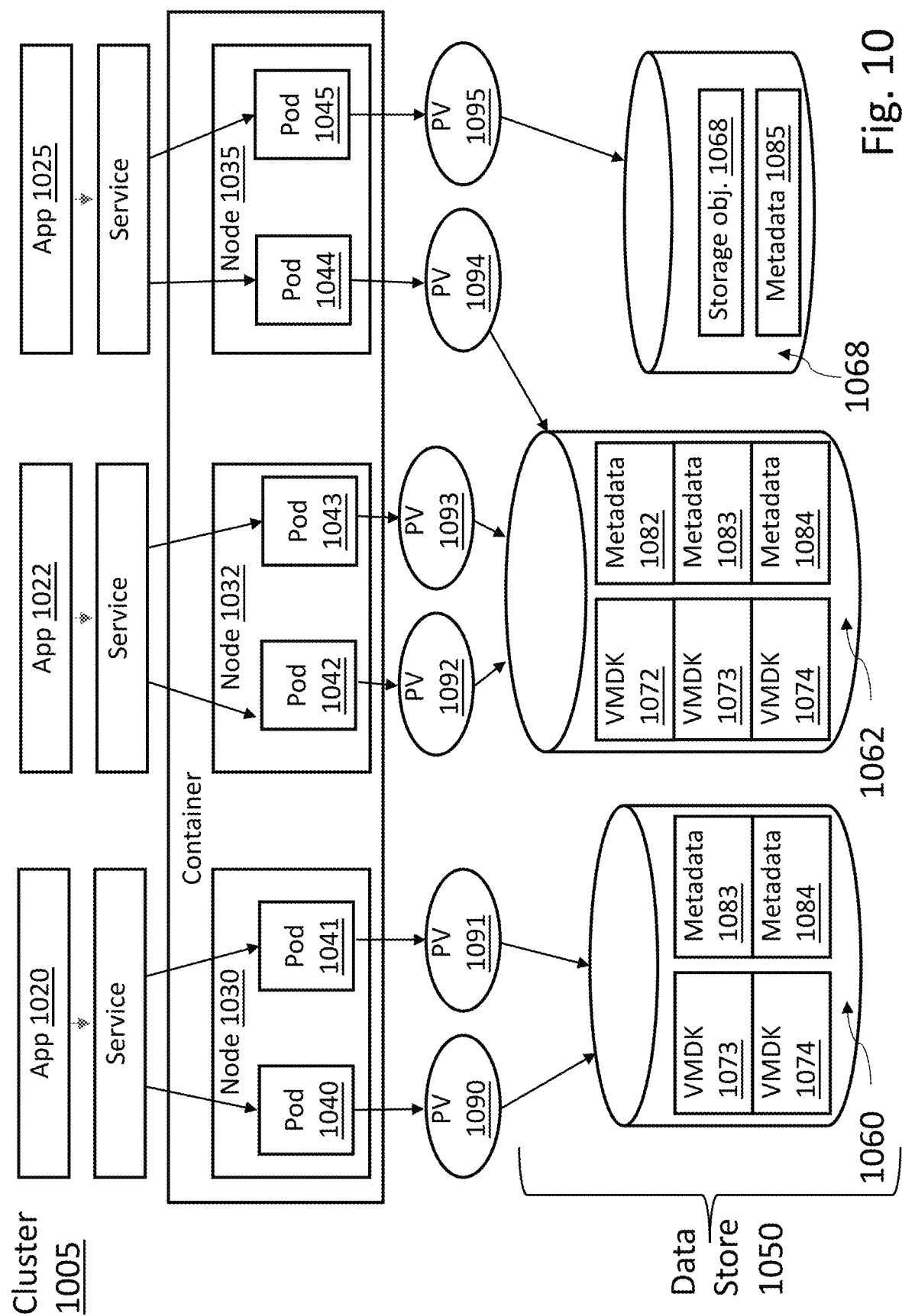
FIG. 10 is a block diagram of one embodiment of a single-site architecture utilizing consistency groups.

FIG. 10 is a block diagram of one embodiment of a single-site architecture utilizing consistency groups. The example of FIG. 10 is provided in terms of a Kubernetes (K8s) cluster; however, other, non-K8s-based configurations can also be supported. In one embodiment, applications (e.g., 1020, 1022, 1025) running within cluster 1005 are mapped to container pods running one or more containers. The container pods can leverage persistent storage objects that are hosted on data store 1050 as, for example, VMDK objects (e.g., 1070-1075).

In various embodiments, the storage objects are wrapped in a virtual machine so that VM-level services are available to the wrapped objects. The wrapping VM can be considered a "CG-VM" for the corresponding consistency group (e.g., 1060, 1062, 1068). In one embodiment, along with the storage (e.g., VMDK) object, a metadata file (e.g., 1080-1085) can be hosted within the VM where information around the persistent storage object can be maintained (e.g., consistency group, mountpoint).

Cluster 1005 can receive incoming traffic that can be routed to any number of supported applications (e.g., 1020, 1022, 1025). Each application can have one or more pods across one or more nodes. In the example of FIG. 10, application 1020 includes pods 1040 and 1041 on node 1030, application 1022 includes pods 1042 and 1043 on node 1032 as well as pod 1044 on node 1035, and application 1025 includes pod 1045 on node 1035.

In one embodiment, in order to protect the applications (e.g., 1020, 1022, 1025) in a consistent manner, multiple storage objects that support the application through multiple pods are backed up/protected at the same time. The concept of the consistency group can support this functionality by placing the storage objects used by an application in the same VM/consistency group.

For example, in FIG. 10, application 1020 has multiple pods (e.g., 1040, 1041), which can each include multiple containers. The multiple containers each have their respective persistent volumes/object (e.g., 1090, 1091), which are protected (backed up/cloned/moved/etc.) together.

In the example configuration of FIG. 10, app 1022 spans three containers (1042, 1043, 1044) that are running on two nodes (1032, 1035), and their corresponding PVs (1092-1094) are protected together as they are part of the same CG. Similarly, application 1025 has one container (1045) running on node 1035 that also runs a container (1044) for application 1022.

Figure 11:
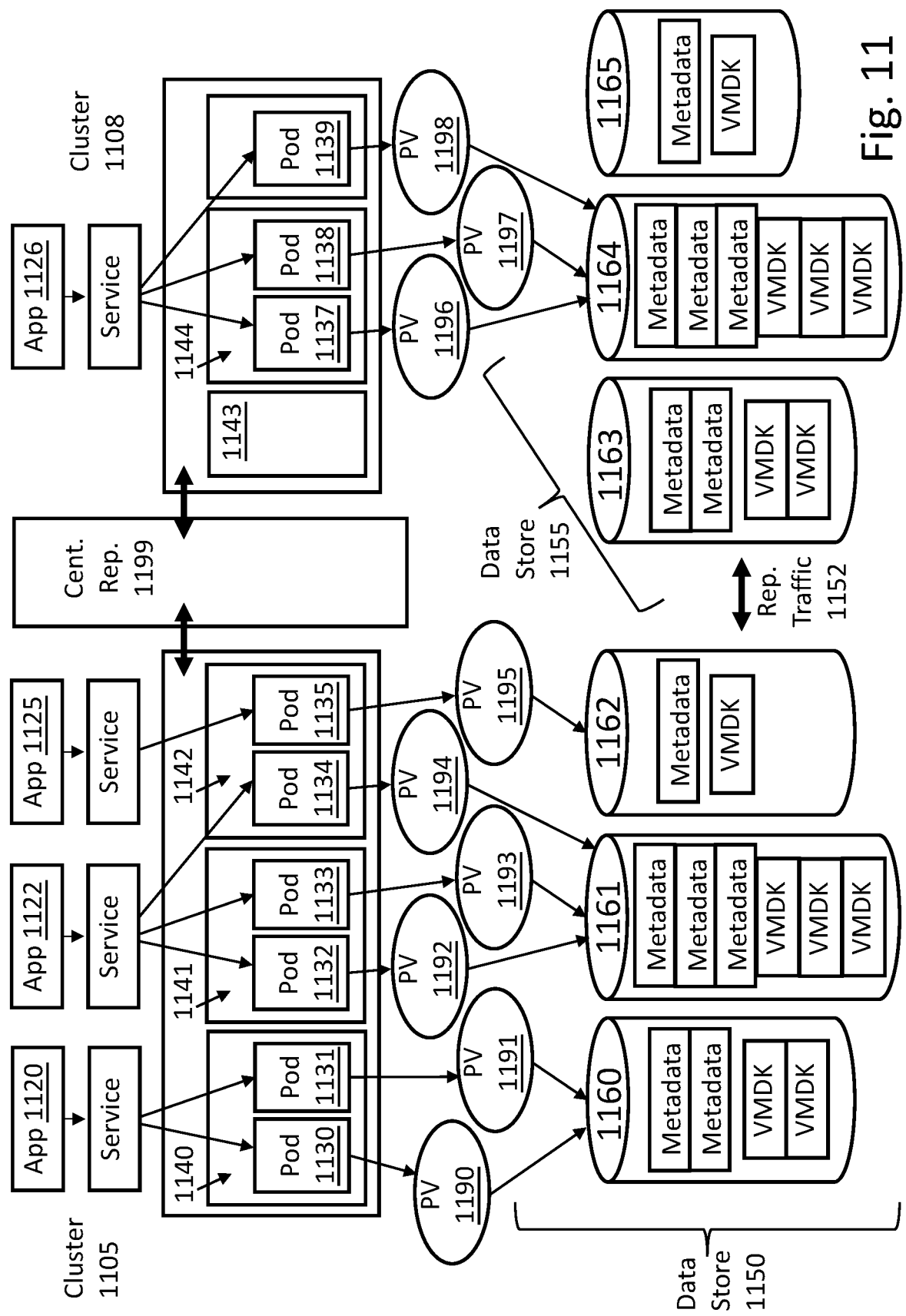
FIG. 11 is a block diagram of one embodiment of a multi-site architecture utilizing consistency groups.

FIG. 11 is a block diagram of one embodiment of a multi-site architecture utilizing consistency groups. Multi-site configurations can be useful, for example, for disaster recovery scenarios and/or running of development and production environments on separate clusters, etc. As discussed above, container images are ephemeral, but the data is to be permanently stored and protected.

The example embodiment of FIG. 11 includes primary cluster 1105 that receives traffic 1100 and secondary cluster 1108 that functions as a replication site. Cluster 1105 includes consistency groups 1160, 1161 and 1162 in data store 1150, each having at least one container storage object and corresponding metadata, which are replicated through replication traffic 1152 to data store 1155 of cluster 1108 as consistency groups 1163, 1164 and 1165, each having replicated container storage objects and metadata. Applications (e.g., 1120, 1122, 1125) running within cluster 1105 are mapped to container pods (e.g., 1130, 1131, 1132, 1133, 1134, 1135) running one or more containers on nodes 1140, 1141, 1142. Application 1126 running within cluster 1108 is mapped to container pods (e.g., 1137, 1138, 1139) running one or more containers on nodes 1143, 1144.

In the multi-site scenario, container images be stored in a registry/repository that can be accessed centrally across both clusters. As described above with respect to FIG. 8, in the event of a disaster, restore functionality can be leveraged to restore the persistent storage object(s) at the remote site cluster into the data store that will be used for container storage object. The restore workflow can reset the metadata file contents.

In one embodiment, the plugin installed in cluster 1108 (at the remote site) can scan the objects within data store 1155 that is leveraged only for container persistent storage. In one embodiment, central repository 1199 can be utilized to pull the container image to the remote site and then map the previously restored container storage object to it. For moving an application from a test or development environment to a production environment in a multi-site environment, a clone operation (see, for example, FIG. 9) can be leveraged to move the container storage object from one site to another.

For example, PVs for application 1122 in cluster 1105 (1192, 1193, 1194) can be moved/cloned to cluster 1108 to become PVs 1196, 1197 and 1198 for application 1126. As part of this process, PVs 1192, 1193 and 1194 in cluster 1105 are moved/cloned to cluster 1108 as PVs 1196, 1197 and 1198, respectively. In one embodiment, containers can be mapped to these backup PVs (1196, 1197 and 1198) when cluster 1108, which has been operating as a backup cluster (or remote site), becomes the primary cluster.

As a result of making the container storage object a VM-wrapped object, all operations that can be performed on a VM can be performed on the container storage object. This also enables backup of container storage objects for long-term retention, for example, or other integrated functionality.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and examples are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and examples are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and examples are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A processor-based method to create a persistent virtual storage volume to be stored in a hive structure in an architecture utilizing virtual machine disk objects, the method comprising:
   creating a first storage container having a virtual storage volume to be persisted across multiple applications, the multiple applications in one or more application containers;
   creating a virtual machine object for the first storage container;
   placing the first storage container within the virtual machine object;
   creating a second storage container having a virtual storage volume to be persisted across the multiple applications;
   placing the second storage container within the virtual machine object to provide a consistency group having the first storage container and the second storage container;
   storing the virtual machine object containing the first and second storage containers of the consistency group in a computer-readable memory as the persistent virtual storage volume; and
   providing access to the persistent virtual storage volume for the multiple applications, wherein the persistent virtual storage volume persists beyond an existence of at least one of the multiple applications.

2. The method of claim 1, further comprising:
   creating a metadata file associated with the virtual machine object, wherein the metadata file tracks the one or more application containers that use the first and second storage containers in the consistency group; and
   storing the metadata file in the computer-readable memory.

3. The method of claim 1, wherein the virtual machine object comprises a virtual machine that wraps the first and second storage containers.

4. The method of claim 1, wherein the first and second storage containers comprise virtual machine disk objects.

5. The method of claim 1, wherein metadata for the first and second storage containers in the consistency group is stored in a single metadata file.

6. The method of claim 1, further comprising:
   receiving a data operation applicable to data in the consistency group; and
   in response to the data operation, initiating at least one of a backup operation, a restore operation, or a clone operation on the consistency group.

7. The method of claim 6, wherein the at least one of the backup operation, the restore operation, or the clone operation is operated on the first and second storage containers together based on the first and second storage containers being part of the consistency group.

8. A system comprising:
   one or more processors; and
   a non-transitory computer-readable storage medium comprising instructions which, when executed by the one or more processors, cause the one or more processors to:
      receive a request to create a persistent virtual storage volume;
      in response to the request to create the persistent virtual storage volume:
         create a first storage container having a virtual storage volume to be persisted across multiple applications, the multiple applications in one or more application containers;
         create a virtual machine for the first storage container;
         place the first storage container within the virtual machine; and
         create a second storage container having a virtual storage volume to be persisted across the multiple applications;
         place the second storage container within the virtual machine to provide a consistency group having the first storage container and the second storage container; and
         store the virtual machine containing the first and second storage containers of the consistency group in a computer-readable memory as the persistent virtual storage volume.

9. The system of claim 8, wherein the instructions when executed cause the one or more processors to:
  create a metadata file associated with the virtual machine, wherein the metadata file tracks the one or more application containers that use the first and second storage containers in the consistency group; and
  store the metadata file in the computer-readable memory.

10. The system of claim 8, wherein the first and second storage containers are subject to data backup or data cloning together based on the first and second storage containers being part of the consistency group.

11. The system of claim 8, wherein the consistency group is specified by a user input.

12. The system of claim 8, wherein metadata for the first and second storage containers in the consistency group is stored in a single metadata file.

13. The system of claim 8, wherein the instructions when executed cause the one or more processors to:
  receive a data operation applicable to data in the consistency group; and
  in response to the data operation, initiate at least one of a backup operation, a restore operation, or a clone operation on the consistency group.

14. The system of claim 13, wherein the at least one of the backup operation, the restore operation, or the clone operation is operated on the first and second storage containers together based on the first and second storage containers being part of the consistency group.

15. A non-transitory computer readable medium comprising instructions which, when executed by one or more processors, cause the one or more processors to:
  receive a request to create a persistent virtual storage volume;
  in response to the request to create the persistent virtual storage volume:
    create a first storage container having a virtual storage volume to be persisted across multiple applications, the multiple applications in one or more application containers;
    create a virtual machine for the first storage container;
    place the first storage container within the virtual machine; and
    create a second storage container having a virtual storage volume to be persisted across the multiple applications;
    place the second storage container within the virtual machine to provide a consistency group having the first storage container and the second storage container; and
  store the virtual machine containing the first and second storage containers in a computer-readable memory as the persistent virtual storage volume.

16. The non-transitory computer readable medium of claim 15, wherein the instructions when executed cause the one or more processors to:
  create a metadata file associated with the virtual machine, wherein the metadata file tracks the one or more application containers that use the first and second storage containers in the consistency group; and
  store the metadata file in the computer-readable memory.

17. The non-transitory computer readable medium of claim 15, wherein the first and second storage containers are subject to data backup or data cloning together based on the first and second storage containers being part of the consistency group.

18. The non-transitory computer readable medium of claim 15, wherein the instructions when executed cause the one or more processors to:
  provide access to the persistent virtual storage volume for the multiple applications, wherein the persistent virtual storage volume persists beyond an existence of at least one of the multiple applications.

19. The non-transitory computer readable medium of claim 15, wherein metadata for the first and second storage containers in the consistency group is stored in a single metadata file.

20. The non-transitory computer readable medium of claim 15, wherein the instructions when executed cause the one or more processors to:
  receive a data operation applicable to data in the consistency group; and
  in response to the data operation, initiate at least one of a backup operation, a restore operation, or a clone operation on the consistency group, wherein the at least one of the backup operation, the restore operation, or the clone operation is operated on the first and second storage containers together based on the first and second storage containers being part of the consistency group.

* * * * *